(12) United States Patent
Iwasaki

(10) Patent No.: US 7,839,579 B2
(45) Date of Patent: Nov. 23, 2010

(54) LENS BARREL, CAMERA AND INFORMATION DEVICE

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/593,969

(22) PCT Filed: Apr. 11, 2008

(86) PCT No.: PCT/JP2008/057551

§ 371 (c)(1),
(2), (4) Date: Sep. 30, 2009

(87) PCT Pub. No.: WO2008/130017

PCT Pub. Date: Oct. 30, 2008

(65) Prior Publication Data

US 2010/0046089 A1 Feb. 25, 2010

(30) Foreign Application Priority Data

Apr. 13, 2007 (JP) ............................. 2007-105491

(51) Int. Cl.
*G02B 15/14* (2006.01)
*G02B 7/02* (2006.01)
(52) U.S. Cl. ...................... 359/700; 359/694; 359/699; 359/826
(58) Field of Classification Search ................. 359/694, 359/699, 700, 701, 703, 704, 819, 823, 826
See application file for complete search history.

(56) References Cited

U.S. PATENT DOCUMENTS 5,701,523 A 12/1997 Omiya et al.
6,853,499 B2 2/2005 Iwasaki
2009/0046156 A1 2/2009 Iwasaki
2009/0046198 A1 2/2009 Iwasaki (Continued)

FOREIGN PATENT DOCUMENTS

JP 2-195313 A 8/1990

(Continued)

*Primary Examiner*—Jack Dinh
(74) *Attorney, Agent, or Firm*—Dickstein Shapiro LLP

(57) ABSTRACT

A cam locus of the cam surface (G1) on the image plane side of the first group cam groove (27) of the rotating cylinder (21) has an angle to a flat surface where the optical axis crosses perpendicularly. In a case in which the cam follower (25) engages with (abuts on) the cam surface (G1) on the image plane side, an impact force is dispersed into the optical axis direction and into the rotating direction of the rotating cylinder (21), and a load which the cam follower (25) and the male helicoid (31) of the rotating cylinder (21) receive is reduced. Additionally, when the first group lens system (11) is pressed by a light load such as a hand operation by a user and the like, the cam follower (25) of the first group lens movement frame (15) engages with (or abuts on) the cam surface (G1) on the image plane side, and an angle of the cam surface (G1) is an angle that an occurring force in the rotating direction is so as to be a moving direction from the collapsed position (S1) to the wide angle end position (W1). Therefore, the rotating cylinder (21) does not rotate easily, and when the load is removed, returns to a position before the load is received.

20 Claims, 8 Drawing Sheets

U.S. PATENT DOCUMENTS

2009/0066829 A1   3/2009   Iwasaki

FOREIGN PATENT DOCUMENTS

| JP | 9-49958 A | 2/1997 |
| JP | 9-189844 A | 7/1997 |
| JP | 9-203842 A | 8/1997 |
| JP | 2000-292845 A | 10/2000 |
| JP | 2000-292846 A | 10/2000 |
| JP | 2003-227989 A | 8/2003 |
| JP | 2003-279827 A | 10/2003 |
| JP | 2003-337276 A | 11/2003 |

LENS BARREL, CAMERA AND INFORMATION DEVICE

TECHNICAL FIELD

The present invention relates to a lens barrel used for an imaging optical system and to a camera and an information device in which the lens barrel is used as an imaging optical system.

BACKGROUND ART

Recently, regarding a lens barrel of an imaging optical system typified as a photographing lens of a camera, there have been increasing ones using a zoom lens in which positions of a plurality of lens groups are changed and the focal length is continuously changed when photographing. In this type of lens barrel, a mainstream type is a so-called collapsed-type zoom lens, which attempts to minimize its size so as to make distances between lens groups narrower and store lenses in a fixed cylinder of the lens barrel when non-photographing. As a structure of moving lenses in the lens barrel of the zoom lens and the like, there has been increasingly used such a mechanism in which a rotating cylinder is held by a fixed barrel, and when the rotating cylinder rotates relative to the fixed cylinder, a lens frame moves forward and backward in an optical axis direction by a cam engagement or a helicoid engagement. As a typical mechanism, there is such a mechanism in which a fixed cylinder and a rotating cylinder are in a cam engagement so as to move the rotating cylinder forward and backward followed by a cam groove while its rotation, inside the rotating cylinder there is a linearly-guiding cylinder which is rotatable relative to the rotating cylinder and is movable integrally with the rotating cylinder in the optical axis direction, and inside the linearly-guiding cylinder there is a lens frame which holds a lens. The lens frame has a cam follower. The cam follower penetrates a linear groove extended in the optical axis direction of the linearly-guiding cylinder, engages with a cam groove provided in an inner surface of the rotating cylinder and thereby when the rotating cylinder rotates, the lens frame, without rotations, is movable to an arbitrary position within a range of a movement by following along a shape of the cam groove.

For example, a rotating key provided protrusively in a radial direction in the linearly-guiding cylinder engages with a rotating groove provided in an inner diameter of the rotating cylinder, and thereby the linearly-guiding cylinder is rotatable around the optical axis relative to the rotating cylinder, also thereby the rotating cylinder and the linearly-guiding cylinder is integrally movable in the optical axis direction. Additionally, the fixed cylinder and the rotating cylinder are in a helicoid engagement during a part of a process from a non-photographing state to a photographing state, and thereby the rotating cylinder is rotatable relative to the fixed cylinder and moves relatively in the optical axis direction. In the photographing state, a flat part of a male helicoid of the rotating cylinder, which is provided in front and rear ends of the male helicoid in the direction of the optical axis and follows along a flat surface where an optical axis crosses perpendicularly, engages with an engaging groove provided in the fixed member, which follows along a flat surface where the optical axis crosses perpendicularly. In the photographing state, the rotating cylinder has a mechanism so as to rotate relative to the fixed cylinder and so as not to move relatively in the optical axis direction, and thereby the lens frame is moved arbitrarily by an engagement of a cam or a cam groove provided in an inner circumferential surface of the rotating cylinder and a cam follower of the fixed cylinder. There is a lens barrel as described above.

Moreover, a lens barrel has been demanded having further miniaturization and therefore engagements of each part have to be smaller and shallower. However, a trend as such weakens impact resistance, for example, for a fall of the lens barrel and so on, and in order to deal with this trend, improving the impact resistance is an urgent need.

On the other hand, the cam with which a lens frame engages draws an angular continuous curve locus in regard to the optical axis and thereby positions of each lens frame can be arranged in arbitrary positions and various focal lengths can be created. The smaller an inclination of the cam to the vertical direction of the optical axis is, the higher a positional accuracy and a tilt of the lens frame in the optical axis direction can be created without a relationship to a stop accuracy of the rotating cylinder, and thereby it is possible to maintain higher accuracy. However, in a case where the inclination of the cam to the vertical direction of the optical axis is small, an impact force caused by a fall and so on is directly transmitted to the cam follower and the male helicoid of the rotating cylinder via the cam follower. And thereby there is such a problem that either of those parts may be broken.

Regarding the impact caused by the fall as described above, for example, Japanese patent publication No. 2000-292846 discloses that it is possible to reduce a load which a cam follower receives by curving a guiding groove for guiding the cam follower, that is, a linearly-guiding groove for guiding the lens frame in the optical axis direction without rotating the lens frame. However, curving the guiding groove as described above may make a lens rotate depending on a movement position of the lens frame, and if a curved part has only a small angle to the optical axis direction, there is no change so that the cam follower still receives the load.

Additionally, for example, Japanese patent publication No. 2000-292845 discloses that breakage can be prevented by providing a guiding wall which abuts on a cam pin, that is, a cam follower when receiving an impact. However, a structure as described above has not only a great limitation on a layout, but also there is no change in a load that the cam follower receives.

On the other hand, for example, Japanese patent publication No. 2003-337276 discloses that in a range of imaging, a load that a cam follower receives can be dispersed into torque for the rotating cylinder and is reduced, not by making a cam surface on an image plane side facing a cam surface on an object side to be parallel to the object side, but by making an inclination angle to a perpendicular direction of an optical axis to be larger than to the object side. Moreover, for example, Japanese patent publication No. 2003-279827 discloses that it is possible for a rotating cylinder not to rotate, to return to a position before receiving a load when the load is removed, and not to be out of focus, if a lens barrel receives an impact from outside, by making at least a part of a cam surface on an image plane side facing a cam surface on an object side not to be parallel to the object side but to be a flat surface which is perpendicular to an optical axis direction.

DISCLOSURE OF THE INVENTION

However, there is no such lens barrel in which it is possible to maintain a positional accuracy of a lens highly, to reduce a load which a cam follower receives and additionally a load which a helicoid of the rotating cylinder receives, and furthermore to prevent a lens position from changing by a load in general use.

An object of the present invention is to provide a lens barrel which makes it possible to maintain positional accuracy of a lens highly, to reduce a load which a cam follower receives and additionally a load which a helicoid of the rotating cylinder receives, and to prevent a lens position from changing by a load in general use, and to provide a camera and an information device in which the lens barrel as described above is used as an imaging optical system.

A lens barrel according to an embodiment of the present invention, comprises: a plurality of lenses; a plurality of lens frames which holds respectively at least one lens of the plurality of lenses; a driving section which moves the lens frames in a direction of an optical axis; a fixed member which holds the driving section; a rotating member included in the driving section and which rotates to move the lens frames to predetermined positions, the rotating member being fitted in an inner circumferential surface of the fixed member and being rotated relative to the fixed member to be movable in the direction of the optical axis, wherein the rotating member moves relative to the fixed member in the direction of the optical axis while rotating relative to the fixed member from a non-photographing state to a photographing state including an initial photographing state, and does not move relative to the fixed member in the direction of the optical axis while rotating relative to the fixed member in the photographing state; cam followers each provided on the lens frames; cams each provided on an inner circumferential surface of the rotating member and each having a cam surface, the cams each being engaged with the corresponding cam followers and each forming a cam locus; and an elastic member provided in the driving section, and which always biases one of the lens frames located closest to an object side as a first lens frame toward the corresponding cam surface on the object side, wherein, in the initial photographing state, the cam locus on the object side of one of the cams engaged with one of the cam followers corresponding to the first lens frame as a first cam forms a part following along a direction perpendicular to the optical axis, and the cam locus on an image plane side of the first cam facing the cam locus on the object side has an angle to the direction perpendicular to the optical axis.

Preferably, in the photographing state, the cam locus of the first cam includes a convexed cam locus on the object side, the cam locus on the object side of the first cam in the convexed cam locus on the object side forms the part following along the direction perpendicular to the optical axis, and the cam locus on the image plane side of the first cam facing the cam locus on the object side has the angle to the direction perpendicular to the optical axis.

Preferably, the angle to the direction perpendicular to the optical axis of the cam locus on the image plane side, in a case in which the first lens frame is press-biased toward the image plane side by a repulsive force of the elastic member and engages with, or abuts on the cam surface on the image plane side, is an angle so as to rotate the rotating member in a same direction as a rotating direction of the rotating member from the non-photographing state to the initial photographing state.

Preferably, the rotating member of the fixed member is fitted during a part of an operation process from the non-photographing state to the photographing state and thereby the rotating member rotates relative to the fixed member and moves relatively in the direction of the optical axis, and in the photographing state, a flat part of a protruding part of the rotating member engages with a groove provided in the fixed member, and thereby in the photographing state, the rotating member rotates relative to the fixed member and does not move relatively in the direction of the optical axis.

Preferably, the flat part of the protruding part of the rotating member is provided in front and rear ends of the protruding part in the direction of the optical axis and follows along a flat surface where the optical axis crosses perpendicularly.

Preferably, the groove provided in the fixed member follows along a flat surface where the optical axis crosses perpendicularly.

Preferably, the rotating member of the fixed member is helicoid fitted during a part of an operation process from the non-photographing state to the photographing state, and thereby the rotating member rotates relative to the fixed member and moves relatively in the direction of the optical axis, and in the photographing state, a flat part of a male helicoid of the rotating member, which is provided in front and rear ends of the male helicoid in the direction of the optical axis and follows along a flat surface where the optical axis crosses perpendicularly, engages with an engaging groove provided in the fixed member, which follows along a flat surface where the optical axis crosses perpendicularly, and thereby in the photographing state, the rotating member rotates relative to the fixed member and does not move relatively in the direction of the optical axis.

A camera according to the embodiment of the present invention comprises the lens barrel as an imaging optical system.

An information device according to the embodiment of the present invention device comprises: a camera function part; and the lens barrel as an imaging optical system of the camera function part.

BRIEF DESCRIPTION OF THE DRAWINGS

The accompanying drawings are included to provide a further understanding of the invention, and are incorporated in and constitute a part of this description. The drawings illustrate an embodiment of the invention and together with the description, serve to explain the principles of the invention.

DESCRIPTION OF NUMERALS

Figure 1:
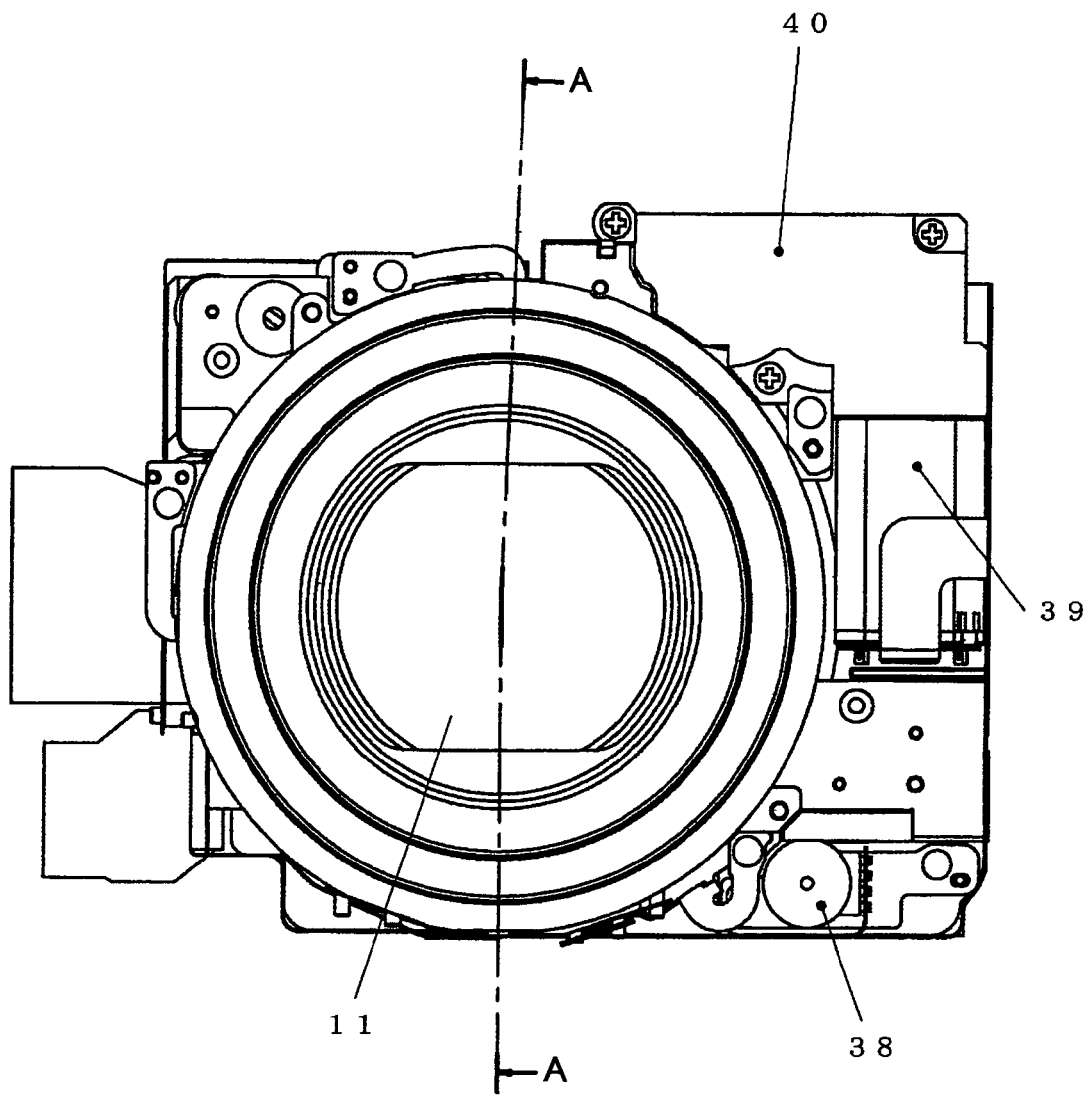
FIG. 1 is a front view from an object side illustrating a structure of a main part of a lens barrel in a collapsed state according to an embodiment of the present invention.
Figure 2:
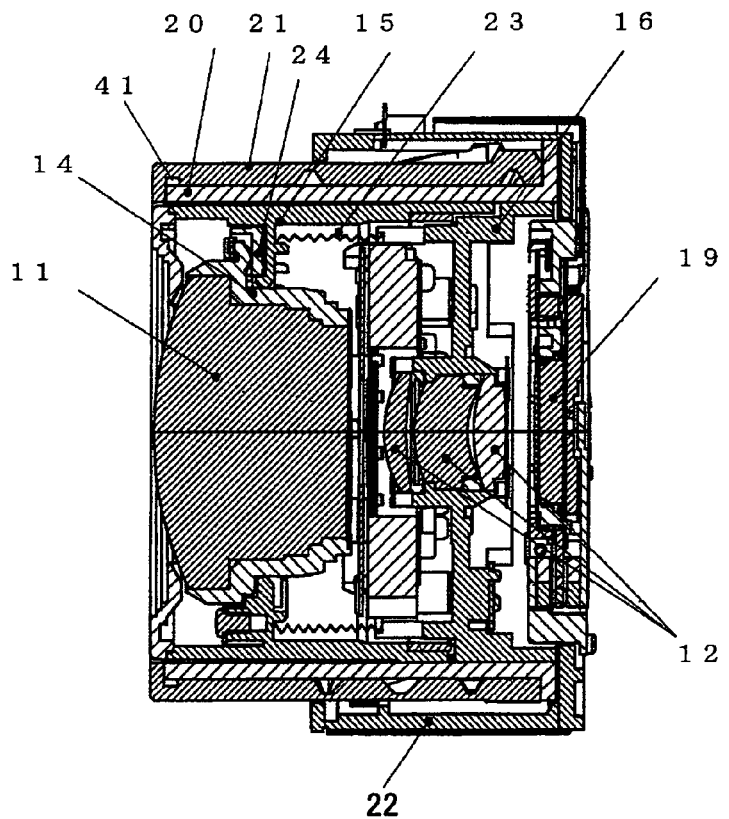
FIG. 2 is a longitudinal sectional view on line A-A in FIG. 1 from an arrow direction illustrating the structure of the main part of the lens barrel.

11 First group lens system
12 Second group lens system
13 Third group lens system
14 First group lens holding frame
15 First group lens movement frame
16 Second group lens movement frame
17 Third group lens movement frame
18 Shutter unit
19 CCD (Charge-Coupled Device) imaging element unit
20 Linearly-guiding cylinder
21 Rotating cylinder
22 Fixed cylinder
23 First group-second group compression spring
24 Tilt adjustment cam
25 First group cam follower
26 Second group cam follower
27 First group cam groove
28 Second group cam groove
29 First group movement frame linear groove
30 Second group movement frame linear groove
31 Male helicoid
32 Linear key part
33 Rotating key part
34 Linear key groove
35 Female helicoid
36 Guiding groove for idling
37 Base
38 Focus driving motor
39 Zoom driving motor
40 Zoom driving gear mechanism section
41 Key groove

BEST MODE FOR CARRYING OUT THE INVENTION

Hereinafter, based on an embodiment according to the present invention, with a reference to drawings, a lens barrel according to the present invention will be explained.

The lens barrel illustrated in FIGS. 1 to 9 includes a first group lens system 11, a second group lens system 12, a third group lens system 13, a first group lens holding frame 14, a first group lens movement frame 15, a second group lens movement frame 16, a third group lens movement frame 17, a shutter unit 18, a CCD (Charge-Coupled Device) imaging element unit 19, a linearly-guiding cylinder 20, a rotating cylinder 21, a fixed cylinder 22, a first group-second group compression spring 23, a tilt adjustment cam 24, a cam follower 25, a second group cam follower 26, a first group cam groove 27, a second group cam groove 28, a first group movement frame linear groove 29, a second group movement frame linear groove 30, a male helicoid 31, a linear key part 32, a rotating key part 33, a linear key groove 34, a female helicoid 35, a guiding groove for idling 36, a base 37, a focus driving motor 38, a zoom driving motor 39, a zoom driving gear mechanism section 40 and a key groove 41.

Figure 3:
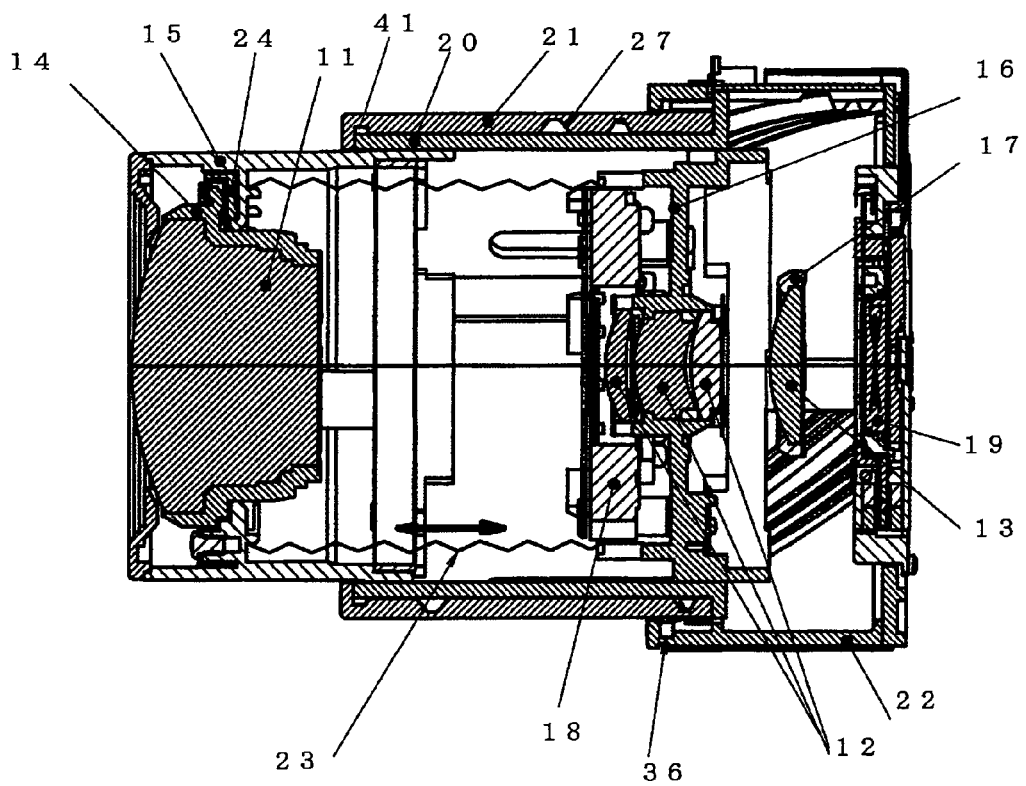
FIG. 3 is a longitudinal sectional view as well as FIG. 2 illustrating the structure of the main part of the lens barrel of FIG. 1 in a photographing state.

As described above, FIGS. 1 and 2 are respectively the front view of a zoom lens barrel in the collapsed state according to the embodiment of the present invention and the longitudinal sectional view on line A-A. FIG. 3 is the longitudinal sectional view of the zoom lens barrel in the photographing state.

An optical system of this zoom lens is structured by the first group lens system 11, the second group lens system 12 and the third group lens system 13. These, the first group lens system 11, the second group lens system 12 and the third group lens system 13 are structured respectively by one or more lenses. In this case, for example, the first group lens system 11 and the second group lens system 12 are both structured by a plurality of lenses and the third group lens system 13 is structured by one lens.

In the photographing state, from the object side, the first group lens system 11, the second group lens system 12 and the third lens system 13 are arranged in numeric order. In the collapsed state, the third group lens system 13 is deviated from an optical axis direction, and in the optical axis direction, the first group lens system 11 and the second group lens system 12 are closely arranged in order from the object side. In both of the photographing and collapsed states, between the first group lens system 11 and the second group lens system 12, the shutter unit 18 having an aperture is arranged. In the photographing state, for example, a movement of changing magnification is performed by changing positions of the first group lens system 11 and the second group lens system 12, and the third group lens system 13 is used for focusing, that is, for a focus adjustment as a focusing lens.

The first group lens system 11 is integrally held by the first group lens holding frame 14. The second group lens system 12 is integrally held by the second group lens movement frame 16. The third group lens system 13 is held by the third group lens movement frame 17. The first group lens holding frame 14 is held by the first group lens movement frame 15. A tilt of the first group lens system 11 of an entire zoom lens optical system in regard to the optical axis direction is adjusted by the tilt adjustment cam 24, which adjusts a tilt between the first group lens holding frame 14 and the first group lens movement frame 15. In the second group lens movement frame 16, the shutter unit 18 is held. The shutter unit 18 is structured to move integrally with the second group lens movement frame 16, that is, the second group lens system 12.

The first group lens holding frame 14 and the first group lens movement frame 15 are structured to be a lens frame for the first group lens system 11. The second group lens system 16 and the third group lens system 17 are structured respectively to be lens frames for the second group lens system 12 and the third group lens system 13.

Figure 4:
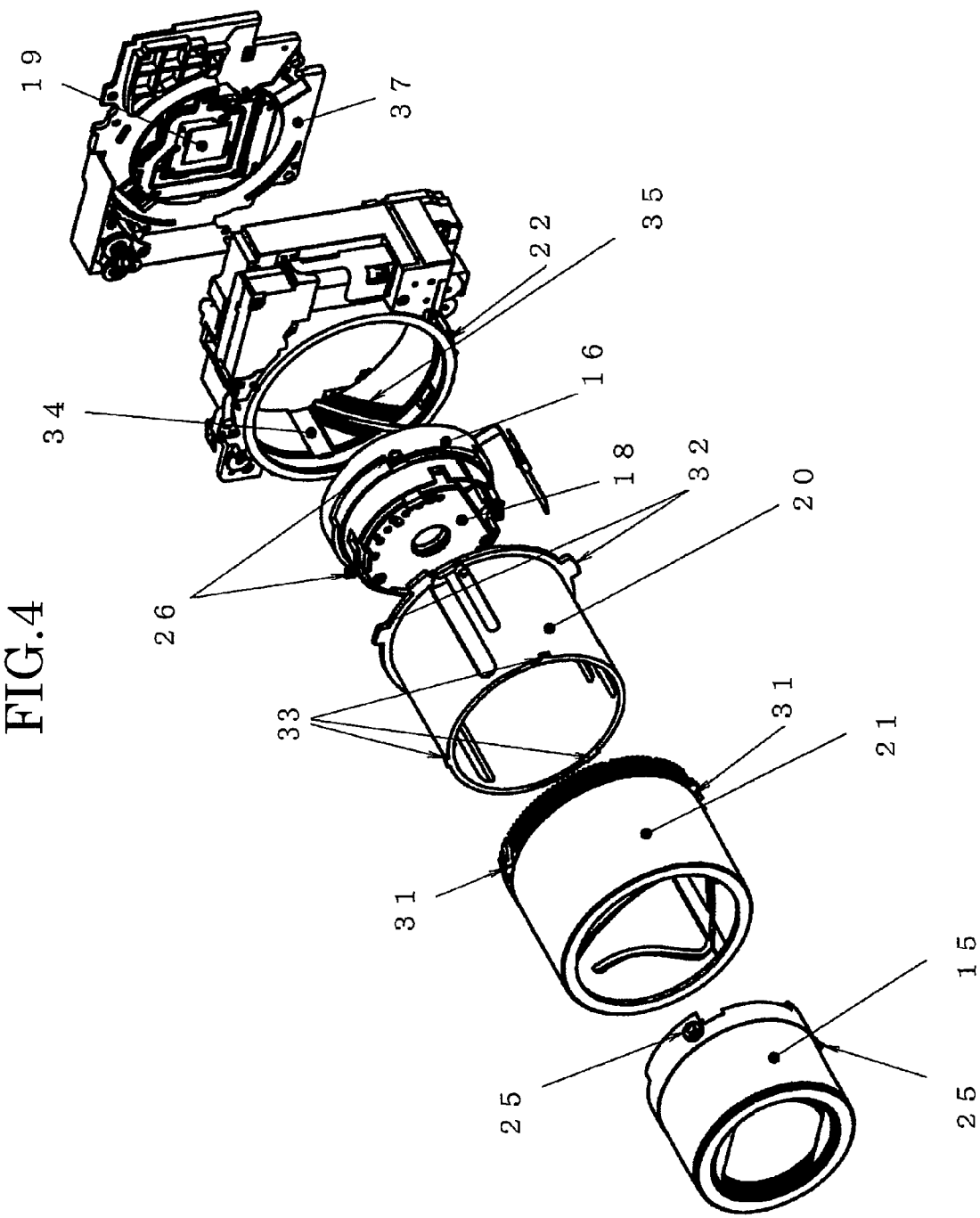
FIG. 4 is an exploded perspective view illustrating the structure of the main part of the lens barrel of FIG. 1.
Figure 5:
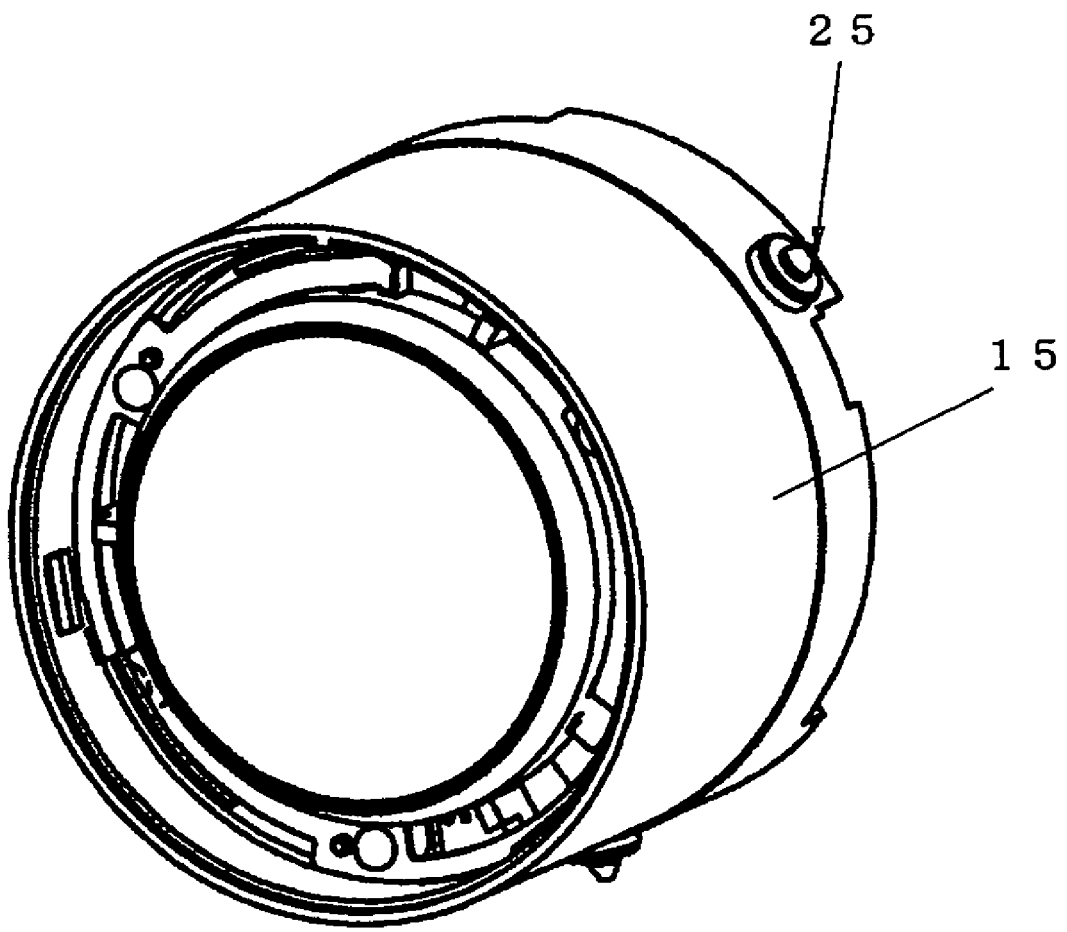
FIG. 5 is a perspective view illustrating a structure of a first group lens movement frame as a first lens frame of the lens barrel of FIG. 1.
Figure 6A:
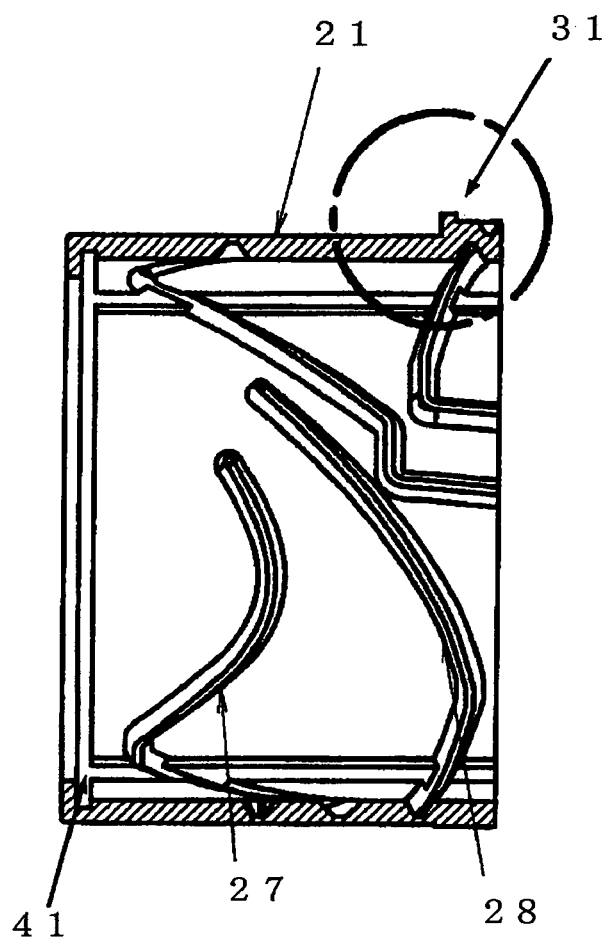
FIG. 6A is a longitudinal sectional view illustrating a structure of a rotating cylinder as a rotating member of the lens barrel of FIG. 1.
Figure 6B:
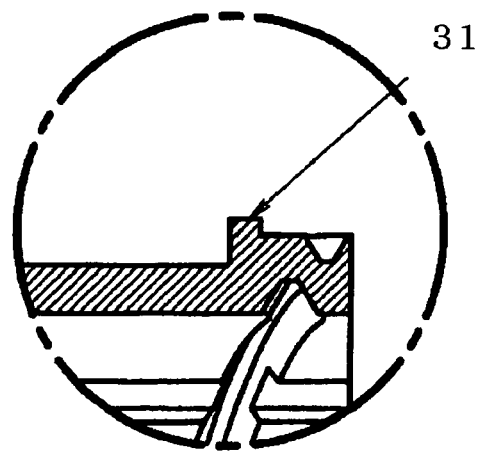
FIG. 6B is a detailed view of a main part of the rotating cylinder illustrating the structure thereof as the rotating member of the lens barrel of FIG. 1.
Figure 7:
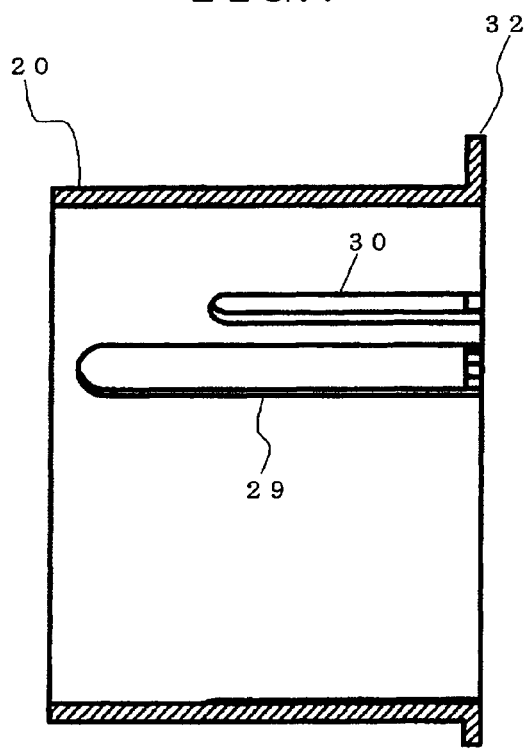
FIG. 7 is a longitudinal sectional view illustrating a structure of a linearly-guiding cylinder of the lens barrel of FIG. 1.
Figure 8:
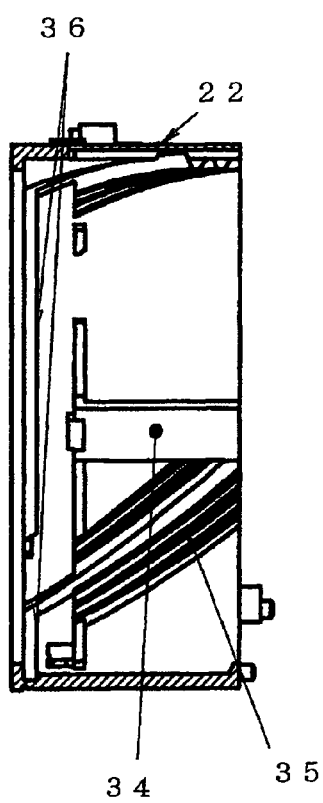
FIG. 8 is a longitudinal sectional view illustrating a structure of a fixed cylinder as a fixed member of the lens barrel of FIG. 1.

With reference to FIG. 4 illustrating the exploded perspective view of the main part of the zoom lens barrel as described above, structures and movements of each part will be explained in detail. FIG. 5 is a perspective view of the first group lens movement frame 15. FIG. 6 is a longitudinal sectional view of the rotating cylinder as a rotating member. FIG. 7 is a longitudinal sectional view of the linearly-guiding cylinder 20 and FIG. 8 is a longitudinal sectional view of the fixed cylinder as a fixed member.

The first group lens movement frame 15 has the first group cam follower 25 engaging with the first group cam groove 27 formed on an inner circumferential surface of the rotating cylinder 21. The second group lens movement frame 16 has the second group cam follower 26 engaging with the second group cam groove 28 formed on an inner circumferential surface of the rotating cylinder 21. These, the first group cam follower 25 and the second group cam follower 26 penetrate the first group movement frame linear groove 29 and the second group movement frame linear groove 30 (FIG. 7), which have slit-shapes extending along in the optical axis direction of the linearly-guiding cylinder 20 interposed between the rotating cylinder 21, and are incorporated.

The linearly-guiding cylinder 20 has the rotating key part 33 formed protrusively in a radial direction at an end part of the object side of the linearly-guiding cylinder 20. The rotating key part 33 fits into the key groove 41 formed in a concave shape on an inner circumferential surface of the rotating cylinder 21. This allows the rotating cylinder 21 and the linearly-guiding cylinder 20 to rotate relatively and to move integrally to the optical axis direction. The male helicoid 31 (See FIG. 6B) is formed protrusively on an outer circumferential surface at an end part of an image plane side of the rotating cylinder 21. The female helicoid 35 is formed on an inner circumferential surface of the fixed cylinder 22. The male helicoid 31 engages with the female helicoid 35, and the rotating cylinder 21 and the fixed cylinder 22 are helicoid fitted as a type of a cam mechanism. The rotating cylinder 21 moves in the optical axis direction by rotating and this makes it possible to extend to a photographable position. The linear key part 32 is provided protrusively on an outer circumferential surface at an end part of an image plane side of the linearly-guiding cylinder 20. The linear key groove 34 is provided on the inner circumferential surface of the fixed cylinder 22 along the optical axis direction. The linear key part 32 of the linearly-guiding cylinder 20 engages with the linear key groove 34 of the fixed cylinder 22, so that the linearly-guiding cylinder 20 can integrally move with the rotating cylinder 21 along the optical axis direction, without rotating relatively.

With a structure as described above, when the rotating cylinder 21 is rotated, the first group lens movement frame 15 and the second group lens movement frame 16 can be moved respectively to predetermined positions by the first group cam groove 27 and the second group cam groove 28 of the rotating cylinder 21. Therefore, the first group lens system 11 and the second group lens system 12 can be moved to photographable positions and a movement of changing magnification can be performed.

Between the first group lens movement frame 15 and the second group lens movement frame 16, the first group-second group compression spring 23, which is a compression spring as an elastic member, is interposed to provide a pressure expanding elastic force. The first group lens movement frame 15 and the second group lens movement frame 16 are biased toward a direction which expands a distance between the two lens movement frames 15 and 16 by a repulsive force of this first group-second group compression spring 23, and then a state in which the first group cam follower 25 and the second group cam follower 26 are always press-contacted with each cam surface corresponding to the first group cam groove 27 and the second group cam groove 28 can be maintained. And thereby, the first group lens system 11 and the second group lens system 12 in regard to the rotating cylinder 21 can be stabilized and maintained without a tilt occurring.

As described above, the female helicoid 35 formed on the inner circumferential surface of the fixed cylinder 22 fits in the male helicoid 31 formed on the outer circumferential surface of the rotating cylinder 21, and by rotations of the rotating cylinder 21, it is possible for the rotating cylinder 21 to move in the optical axis direction. A part of the female helicoid 35 of the fixed cylinder 22 at a very end part of the object side has a guiding groove for idling 36, which is provided along a flat surface where the optical axis crosses perpendicularly. The male helicoid 31 of the end part of the image plane side of the rotating cylinder 21 fits in the guiding groove for idling 36. And thereby the rotating cylinder 21 can be extended to the very end part, and even if the rotating cylinder 21 is rotated furthermore, the rotating cylinder 21 can not be moved any more in the optical axis direction and only a rotation movement around the optical axis can be performed.

A lens barrel according to this embodiment sets a photographing state to be a state from a wide angle end in which a focal length is short to a telephoto end in which the focal length is long in an area where only the rotation movement is possible at the very end part of the image plane side of the fixed cylinder 22. When the rotating cylinder 21 rotates, the first group lens system 11 and the second group lens system 12 can be continuously moved from the wide angle end to the telephoto end.

Figure 10:
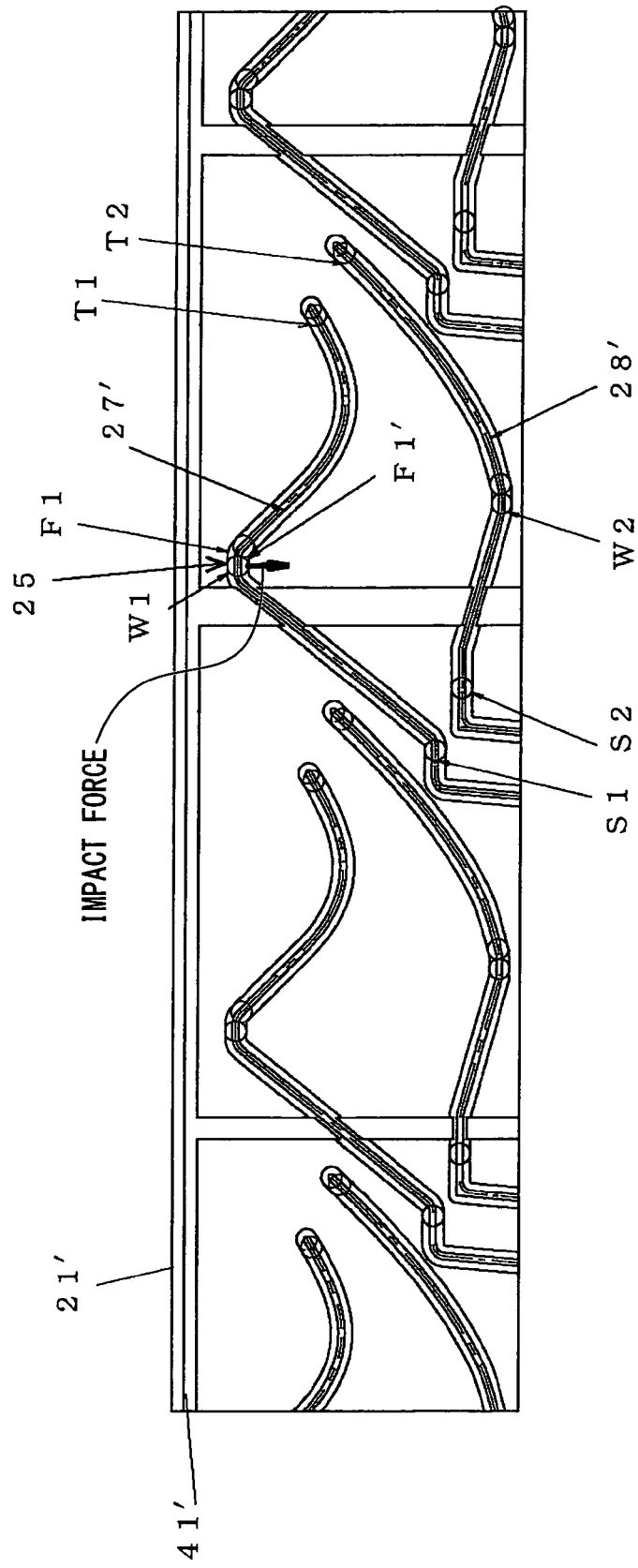
FIG. 10 is a development view illustrating shapes of the first group cam for the first group lens movement frame and the second group cam for the second group lens movement frame formed on the inner circumferential surface of the rotating cylinder as the rotating member of the lens barrel of FIG. 1 envisaged in a previous step to the structure according to the embodiment of the present invention.

FIG. 10 is a development view of cams or cam grooves, which are applied to this embodiment, including a first group cam groove 27' and a second group cam groove 28', which are provided on an inner circumferential surface of a rotating cylinder 21'. In positions W1 and W2, the wide angle ends which are in an initial photographing state, and their neighborhoods, cam loci of cam surfaces on the object side and on the image plane side are provided perpendicularly to the optical axis, in other words, each side of the cam grooves forming cam surfaces on the object side and on the image plane side are provided perpendicularly to the optical axis, and additionally an engagement part of the male helicoid of the rotating cylinder 21' and the guiding groove for idling 36 of the fixed cylinder 22 is also perpendicular to the optical axis. Therefore, even if an accuracy of a stop position of the rotating cylinder 21' is low, a displacement in regard to the optical direction of the first group lens system 11 and the second group lens system 12 does not occur.

Additionally, for example, in the present embodiment, three first group cam grooves 27' of the rotating cylinder 21', three second group cam grooves 28 and three male helicoids 31 are provided, although they are not limited hereto. If each height is controlled properly, or if depths of the first group cam grooves 27' and the second groups cam grooves 28 and heights of the male helicoids 31 are controlled properly, tilts of the first group lens system 11 and the second group lens system 12 can be reduced. In a case such that the cam grooves have angles to the direction perpendicular to the optical axis, if there are shifts for each positional accuracy in a rotating direction of the three cams, tilting of the first group lens system 11 and the second group lens system 12 may occur. Therefore, in the zoom lens as described above, in an initial position of the lens, that is, in a wide angle end, a stable positional accuracy in the optical axis direction and a relation of lens groups without the tilts can be created and an accurate focal length and a high image quality can be obtained by controlling the depths of the first group cam grooves 27' and the second group cam grooves 28 and the heights of the male helicoids properly.

However, in a structure illustrated in FIG. 10, when the first group lens system 11 receives an impact from the object side, the cam follower 25 hits a cam surface F1' on the image plane side facing a cam surface F1 on the object side, and the cam follower 25 and the rotating cylinder 21' receive the impact force. In this case, if the first group cam groove 27' has a structure such that a cam locus of a cam surface on the object side and a cam locus of a cam surface on the image plane side which is facing the former one are created parallel as shapes of cam grooves in other focal lengths, the cam surface on the image plane side follows along a flat surface where the optical axis crosses vertically, and the impact force in the optical axis direction is directly transmitted to the cam follower 25 and the rotating cylinder 21'. As a result, such problems as breakages of the cam follower 25 and the male helicoid 31 of the rotating cylinder 21' may occur.

Figure 9:
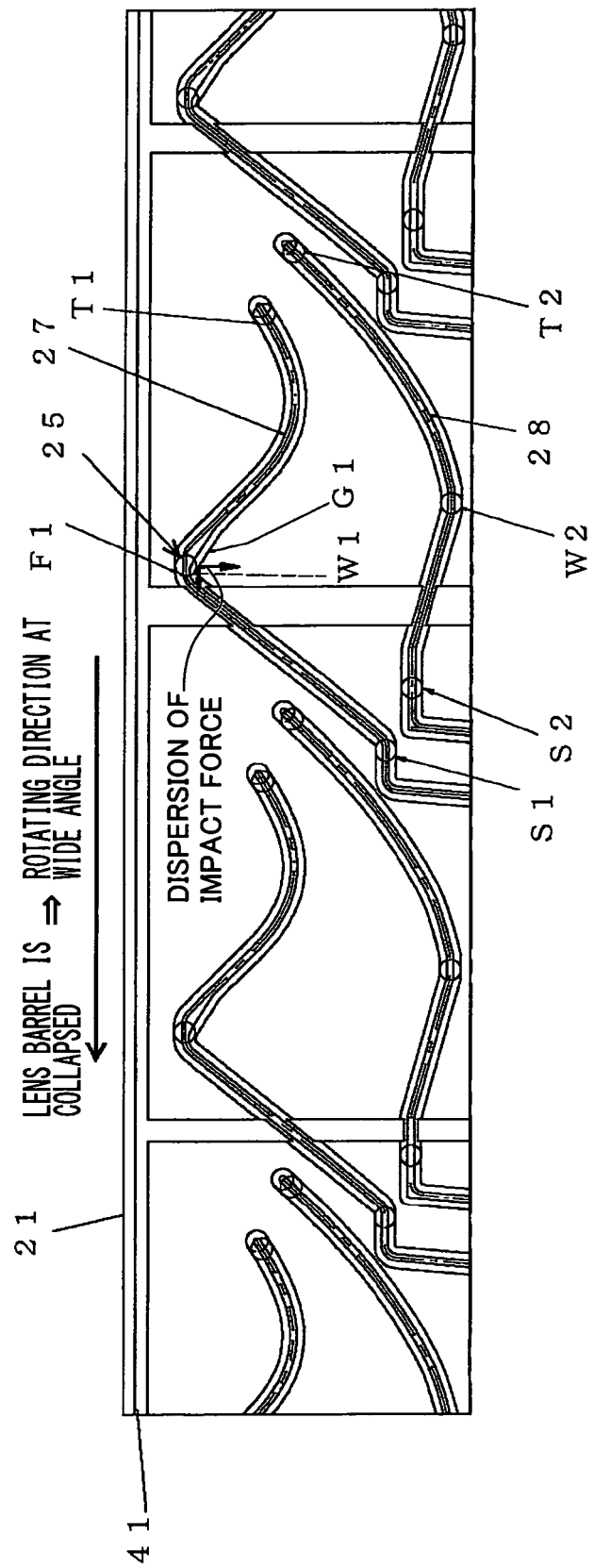
FIG. 9 is a development view illustrating shapes of a first group cam for a first group lens movement frame and a second group cam for a second group lens movement frame formed on an inner circumferential surface of the rotating cylinder as the rotating member of the lens barrel of FIG. 1 according to the embodiment of the present invention.

Therefore, in an embodiment of the present invention, as the rotating cylinder 21 illustrated in FIG. 9, a cam locus of a cam surface G1 on the image plane side of the first group cam groove 27 has an angle to the direction perpendicular to the optical axis. And thereby, in a case that the cam follower 25 engages with (or abuts on) the cam surface G1 of the cam groove 27 on the image plane side, the impact force is dispersed into the optical axis direction and into the rotating direction of the rotating cylinder 21. Thus, the load which the cam follower 25 and the male helicoid 31 of the rotating cylinder 21 receive is reduced, and breakages of the cam follower 25 and the male helicoid 31 of the rotating cylinder 21 can be prevented effectively. In FIG. 9, S1, W1 and T1 denote respectively a collapsed position, a wide angle end position and a telephoto end position in the first group cam groove 27, and S2, W2 and T2 denote respectively a collapsed position, a wide angle end position and a telephoto end position in the second group cam groove 28.

Additionally, in general, regarding a product such as a camera used by not only experts but also by general users, it is envisaged that the first group lens system 11 is carelessly handled and pressed. When it is pressed not with an impact such as a hit by something but with a light load such as a user's hand operation, the cam follower 25 engages with (or abuts on) the cam surface G1 on the image plane side and provides torque to the rotating cylinder 21. If the rotating cylinder 21 rotates and the load provided by the user is removed, the cam follower 25 is biased by the first group-second group compression spring 23 and returns to the cam locus of the cam surface F1 on the object side. In this case, if a position of the cam has been changed before receiving the load, and thereby a focal length is shifted, such problems as being out of focus and so on may occur.

In response, an angle of the cam locus of the cam surface G1 on the image plane side is set to be a rotating direction when the cam follower 25 engages (or abuts) so as to correspond to a rotating direction when the cam follower 25 moves from the collapsed position S1 to the wide angle end position W1. In a state such that the cam follower 25 rotates from the collapsed position S1 to the wide angle end position W1 and stops at the wide angle end position W1, regarding the rotating direction from the collapsed position S1 to the wide angle end position W1, there is no play in the rotating direction by a backlash of a zoom gear and the like, and the rotating cylinder 21 does not rotate easily in the rotating direction from the collapsed position S1 to the wide angle end position W1. (On the other hand, regarding the rotating direction from the wide angle end position W1 to the collapsed position S1, there is a play in the rotating direction by a backlash of the zoom gear and the like.) In the embodiment of the present invention, in a case that the cam follower 25 engages with (or abuts on) the cam surface on the image plane side by the light load, a force in the direction from the collapsed position S1 to the wide angle end position W1 is added to the cam follower 25 and the cam follower 25 does not rotate. Even in a case such that the load is removed and the cam follower 25 engages with (or abuts on) the cam surface G1 on the image plane side, the rotating cylinder 21 does not rotate. And thereby if the cam follower 25 returns to the cam surface F1 on the object side when the load is removed, the cam follower 25 can return to the position before the load is received. Therefore, before and after pressing the first group lens system 11 by the light load, positions of the first group lens system 11 and the second group lens system 12 are not changed and such problems as being out of focus and so on do not occur.

As described above, the lens barrel according to the embodiment of the present invention can ensure a stable lens position. An impact force by a fall and so on can be dispersed into the directions of rotating and the optical axis by the cam locus of the cam surface on the image plane side which has an angle. Entire impact force is prevented from being applied to the male helicoid via the cam follower, and this makes the impact resistance of the lens barrel improve. Additionally, even if the lens barrel receives a casual light load by a wrong operation and so on in general use, an out of focus state is prevented.

Furthermore, the lens barrel according to the embodiment as described above can be applied as a photographing optical system and structured to be a camera, and a similar lens barrel can be applied as an imaging optical system to information devices equipped with a camera function such as a PDA (Personal Data Assistant), a mobile phone and the like.

According to the embodiment of the present invention, a lens barrel, which can maintain a positional accuracy of a lens highly, reduce a load which at least one cam follower receives and additionally a load which at least one helicoid of a rotating cylinder receives, and prevent a lens position from changing by a load in a general use, can be provided, and also a camera and an information device in which the lens barrel as described above is used can be provided.

The lens barrel as described above, particularly, can highly maintain a tilt of a lens frame and a positional accuracy in an optical axis direction, disperse an impact force onto a cam surface on an image plane side, when receiving an impact by a fall and so on, into a rotating direction and reduce the force to the cam follower, and further improve an impact resistance.

The lens barrel as described above, particularly, can highly maintain a tilt of a lens frame and a positional accuracy in an optical axis direction in an initial photographing state, disperse an impact force onto a cam surface on an image plane side, when receiving an impact by a fall and so on, into a rotating direction and reduce the force to the cam follower, and further improve an impact resistance in the initial photographing state.

The lens barrel as described above, particularly, can avoid such problems as a change of a focal length, being out of focus and so on. Particularly, in a state that there is no backlash of a driving source, when a first group lens frame is pressed by a light load, for example, by a photographer's hand, and engages with (or abuts on) a cam surface on the image plane side, a rotating member does not rotate, even if the load is removed and the rotating member returns to engage with (or abut on) a cam surface on an object side by an elastic member, can maintain the state before receiving the load and can avoid such problems as a change of a focal length, being out of focus and so on.

The lens barrel as described above, particularly, can disperse an impact force such as a fall and so on into a rotating direction and into an optical axis direction by a cam surface on an image plane side which has an angle, prevent all the impact force from being applied to the cam follower and the male helicoid, and further improve an impact resistance.

Regarding a camera having the lens barrel described above as an imaging optical system, particularly, a positional accuracy of a lens can be high and an impact resistance can be increased.

Regarding an information device having a camera function part which includes the lens barrel described above as an imaging optical system, particularly, a positional accuracy of a lens in the camera function part can be high and an impact resistance can be increased.

Although the present invention has been described in terms of exemplary embodiments, it is not limited hereto. It should be appreciated that variations may be made in the embodiments described by persons skilled in the art without departing from the scope of the present invention as defined by the following claims.

The present supplication is based on and claims priority from Japanese Application No. 2007-105491, filed on Apr. 13, 2007, the disclosure if which is hereby incorporated by reference herein in its entirety.

The invention claimed is:

1. A lens barrel, comprising:
   a plurality of lenses;
   a plurality of lens frames each of which holds respectively at least one lens of the plurality of lenses;
   a driving section which moves the lens frames in a direction of an optical axis;
   a fixed member which holds the driving section;
   a rotating member included in the driving section and which rotates to move the lens frames to predetermined positions, the rotating member being fitted in an inner circumferential surface of the fixed member and being rotated relative to the fixed member to be movable in the direction of the optical axis, wherein the rotating member moves relative to the fixed member in the direction of the optical axis while rotating relative to the fixed member from a non-photographing state to a photographing state including an initial photographing state, and does not move relative to the fixed member in the direction of the optical axis while rotating relative to the fixed member in the photographing state;
   cam followers each provided on the lens frames;
   cams each provided on an inner circumferential surface of the rotating member and each having a cam surface, the cams each being engaged with the corresponding cam followers and each forming a cam locus; and
   an elastic member provided in the driving section, and which always biases one of the lens frames located closest to an object side as a first lens frame toward the corresponding cam surface on the object side,
   wherein, in the initial photographing state, the cam locus on the object side of one of the cams engaged with one of the cam followers corresponding to the first lens frame as a first cam forms a part following along a direction perpendicular to the optical axis, and the cam locus on an image plane side of the first cam facing the cam locus on the object side has an angle to the direction perpendicular to the optical axis.

2. The lens barrel according to claim 1, wherein, in the photographing state, the cam locus of the first cam includes a convexed cam locus on the object side, the cam locus on the object side of the first cam in the convexed cam locus on the object side forms the part following along the direction perpendicular to the optical axis, and the cam locus on the image plane side of the first cam facing the cam locus on the object side has the angle to the direction perpendicular to the optical axis.

3. The lens barrel according to claim 2,
   wherein the angle to the direction perpendicular to the optical axis of the cam locus on the image plane side, in a case in which the first lens frame is press-biased toward the image plane side by a repulsive force of the elastic member and engages with, or abuts on the cam surface on the image plane side, is an angle so as to rotate the rotating member in a same direction as a rotating direction of the rotating member from the non-photographing state to the initial photographing state.

4. The lens barrel according to claim 2,
   wherein the rotating member and the fixed member are fitted during a part of an operation process from the non-photographing state to the photographing state and thereby the rotating member rotates relative to the fixed member and moves relatively in the direction of the optical axis, and in the photographing state, a flat part of a protruding part of the rotating member engages with a groove provided in the fixed member, and thereby in the photographing state, the rotating member rotates relative to the fixed member and does not move relatively in the direction of the optical axis.

5. The lens barrel according to claim 4,
   wherein the flat part of the protruding part of the rotating member is provided in front and rear ends of the protruding part in the direction of the optical axis and follows along a flat surface where the optical axis crosses perpendicularly.

6. The lens barrel according to claim 4,
   wherein the groove provided in the fixed member follows along a flat surface where the optical axis crosses perpendicularly.

7. The lens barrel according to claim 2,
   wherein the rotating member and the fixed member are helicoid fitted during a part of an operation process from the non-photographing state to the photographing state, and thereby the rotating member rotates relative to the fixed member and moves relatively in the direction of the optical axis, and in the photographing state, a flat part of a male helicoid of the rotating member, which is provided in front and rear ends of the male helicoid in the direction of the optical axis and follows along a flat surface where the optical axis crosses perpendicularly, engages with an engaging groove provided in the fixed member, which follows along a flat surface where the optical axis crosses perpendicularly, and thereby in the photographing state, the rotating member rotates relative to the fixed member and does not move relatively in the direction of the optical axis.

8. The lens barrel according to claim 1,
   wherein the angle to the direction perpendicular to the optical axis of the cam locus on the image plane side, in a case in which the first lens frame is press-biased toward the image plane side by a repulsive force of the elastic member and engages with, or abuts on the cam surface on the image plane side, is an angle so as to rotate the rotating member in a same direction as a rotating direction of the rotating member from the non-photographing state to the initial photographing state.

9. The lens barrel according to claim 8,
   wherein the rotating member and the fixed member are fitted during a part of an operation process from the non-photographing state to the photographing state and thereby the rotating member rotates relative to the fixed member and moves relatively in the direction of the optical axis, and in the photographing state, a flat part of a protruding part of the rotating member engages with a groove provided in the fixed member, and thereby in the photographing state, the rotating member rotates relative to the fixed member and does not move relatively in the direction of the optical axis.

10. The lens barrel according to claim 9,
    wherein the flat part of the protruding part of the rotating member is provided in front and rear ends of the protruding part in the direction of the optical axis and follows along a flat surface where the optical axis crosses perpendicularly.

11. The lens barrel according to claim 9, wherein the groove provided in the fixed member follows along a flat surface where the optical axis crosses perpendicularly.

12. The lens barrel according to claim 9, wherein, in the photographing state, the cam locus of the first cam includes a convexed cam locus on the object side, the cam locus on the object side of the first cam in the convexed cam locus on the object side forms the part following along the direction perpendicular to the optical axis, and the cam locus on the image plane side of the first cam facing the cam locus on the object side has the angle to the direction perpendicular to the optical axis, and
wherein the flat part of the protruding part of the rotating member is provided in front and rear ends of the protruding part in the direction of the optical axis and follows along a flat surface where the optical axis crosses perpendicularly.

13. The lens barrel according to claim 9, wherein, in the photographing state, the cam locus of the first cam includes a convexed cam locus on the object side, the cam locus on the object side of the first cam in the convexed cam locus on the object side forms the part following along the direction perpendicular to the optical axis, and the cam locus on the image plane side of the first cam facing the cam locus on the object side has the angle to the direction perpendicular to the optical axis, and
wherein the groove provided in the fixed member follows along a flat surface where the optical axis crosses perpendicularly.

14. The lens barrel according to claim 8,
wherein the rotating member and the fixed member are helicoid fitted during a part of an operation process from the non-photographing state to the photographing state, and thereby the rotating member rotates relative to the fixed member and moves relatively in the direction of the optical axis, and in the photographing state, a flat part of a male helicoid of the rotating member, which is provided in front and rear ends of the male helicoid in the direction of the optical axis and follows along a flat surface where the optical axis crosses perpendicularly, engages with an engaging groove provided in the fixed member, which follows along a flat surface where the optical axis crosses perpendicularly, and thereby in the photographing state, the rotating member rotates relative to the fixed member and does not move relatively in the direction of the optical axis.

15. The lens barrel according to claim 1,
wherein the rotating member and the fixed member are fitted during a part of an operation process from the non-photographing state to the photographing state and thereby the rotating member rotates relative to the fixed member and moves relatively in the direction of the optical axis, and in the photographing state, a flat part of a protruding part of the rotating member engages with a groove provided in the fixed member, and thereby in the photographing state, the rotating member rotates relative to the fixed member and does not move relatively in the direction of the optical axis.

16. The lens barrel according to claim 15,
wherein the flat part of the protruding part of the rotating member is provided in front and rear ends of the protruding part in the direction of the optical axis and follows along a flat surface where the optical axis crosses perpendicularly.

17. The lens barrel according to claim 15,
wherein the groove provided in the fixed member follows along a flat surface where the optical axis crosses perpendicularly.

18. The lens barrel according to claim 1,
wherein the rotating member and the fixed member are helicoid fitted during a part of an operation process from the non-photographing state to the photographing state, and thereby the rotating member rotates relative to the fixed member and moves relatively in the direction of the optical axis, and in the photographing state, a flat part of a male helicoid of the rotating member, which is provided in front and rear ends of the male helicoid in the direction of the optical axis and follows along a flat surface where the optical axis crosses perpendicularly, engages with an engaging groove provided in the fixed member, which follows along a flat surface where the optical axis crosses perpendicularly, and thereby in the photographing state, the rotating member rotates relative to the fixed member and does not move relatively in the direction of the optical axis.

19. A camera comprising the lens barrel according to claim 1 as an imaging optical system.

20. An information device comprising:
a camera function part; and
the lens barrel according to claim 1 as an imaging optical system of the camera function part.

* * * * *